Aug. 18, 1931.  A. S. RIDLEY  1,819,442
PEACH PITTING MACHINE
Filed July 11, 1929
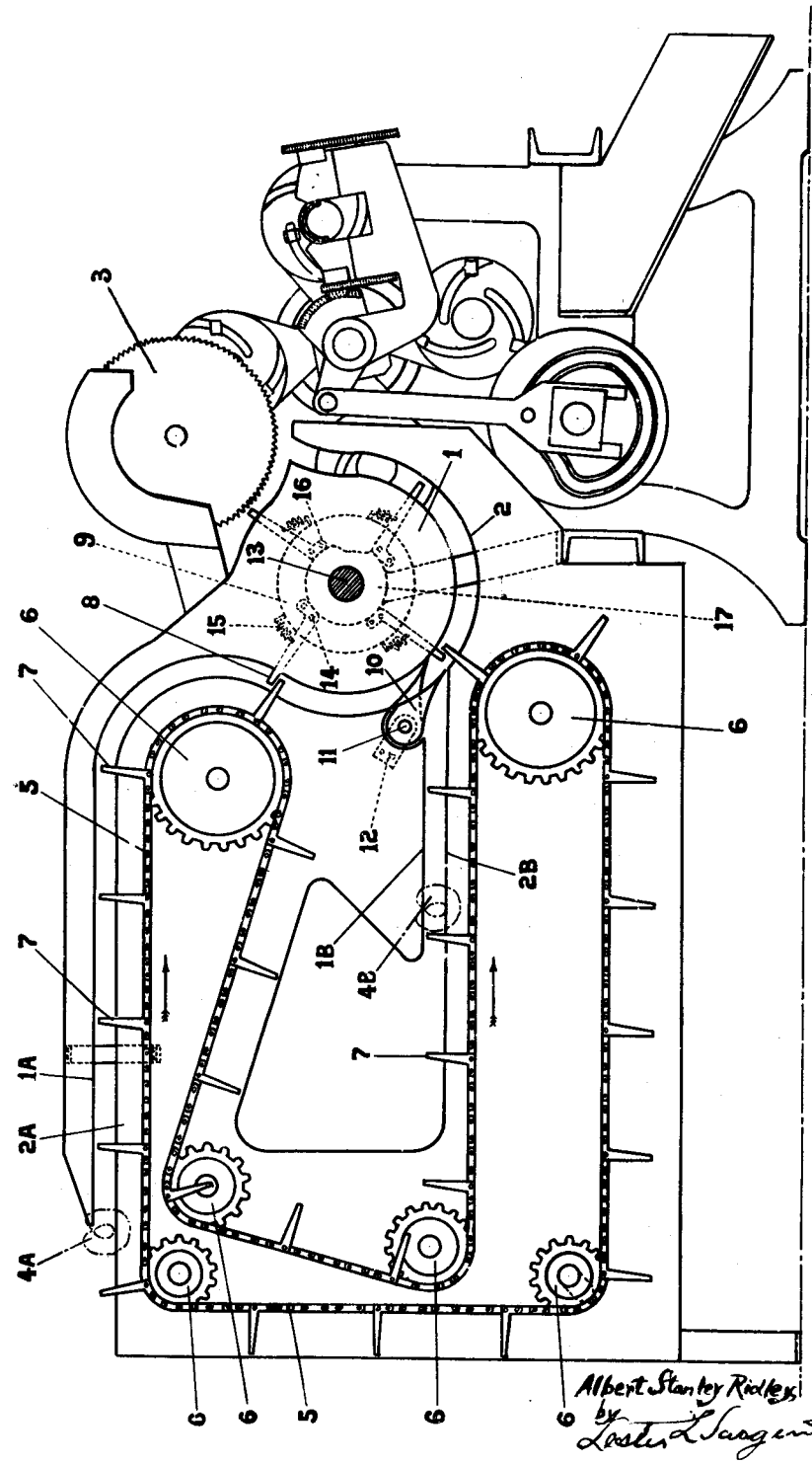

Patented Aug. 18, 1931

1,819,442

UNITED STATES PATENT OFFICE

ALBERT STANLEY RIDLEY, OF MELBOURNE, VICTORIA, AUSTRALIA

PEACH PITTING MACHINE

Application filed July 11, 1929, Serial No. 377,506, and in Australia July 12, 1928.

My invention relates to improved feeding means for use in connection with machines for pitting peaches and like fruit.

The object of the invention is to provide improved means for feeding the fruit rapidly to the fruit halving and pitting mechanism. I accomplish this object by the mechanism illustrated in the accompanying drawing.

The accompanying drawing is a side elevation of a feeding means and pitting mechanism associated therewith which embody my invention.

A main guideway is formed by two blades 1 and 2 superposed one above the other and extending as a continuous undulatory curve without sharp angles and with the blades evenly spaced apart to a point just beneath a circular saw 3 at which point the fruit is seized by gripping means such as that described in the specification of co-pending joint application of Arthur Talbot Tottenham and myself, Serial No. 162,308 filed on the 20th January 1927 or in my co-pending application, Serial No. 245,986 filed 11th January 1928. The fruit 4A is fed by an operative to a tributary guideway formed by parallel blades 1A and 2A, the fruit being pushed on to the blades with the pit in the correct position for pitting. The fruit is then entirely supported by the blades which act as a guideway for the fruit.

An endless chain 5 passes over sprockets 6, one of which is driven by any known suitable means (not shown) and the chain carries upright pusher fingers 7 which are adapted to push the fruit along the guideway to a position where it is engaged by radial fingers 8 of a rotary disc 9. A second guideway is formed by guide-blades 1B and 2B and these blades are adapted to receive fruit 4B fed thereonto by a second operative. The chain 5 and fingers 7 are so arranged that fruit 4B, carried along the blades 1B and 2B by the fingers 7, reaches the main guideway formed by the blades 1 and 2 alternately in relation to fruit 4A carried along the blades 1A and 2A by the fingers 7. At the junction of these tributary guideways formed by the blades 1A, 2A and 1B, 2B, respectively, a gate-blade 10 is provided and this is pivoted at 11 to a bracket or other support 12 by which it is connected to the blade 1B or to the frame. This pivoted gate-blade allows the fruit 4A to ride over it as it virtually forms portion of the blade 2; but, being pivoted, it also allows the fruit 4B to lift it and pass under it and it then forms virtually a portion of the blade 1B. The radial fingers 8 should move twice as fast as the pusher fingers 7 in order to carry the fruit forward in properly spaced relationship. The disc upon which the radial fingers are carried is mounted on a shaft 13 suitably driven from the driving shaft of the machine. The radial fingers are pivotally mounted at 14 upon the rotary disc and are provided with retaining springs 15. These radial fingers are of bell-crank construction and their shorter arms 16 are held by the springs 15 in contact with a stationary cam 17.

The cam 17 is so shaped that the radial bell-crank fingers will lag when the fruit comes into the position where it is seized by the grippers which carry it forward to fruit-cutting and pitting mechanism.

In the construction shown a circular saw 3 is provided which severs the pit and flesh of the fruit into two halves before the fruit is carried to the pitting mechanism.

In operation the operatives have merely to place the peaches or other fruit upon the guideway so as to impale each peach upon the guide-blades in such a position that the blades enter the flesh of the peach at its valley or suture. The operation of the machine from that point is automatic.

It will thus be seen that the tributary guide-blades in conjunction with the main guide-blades form guide-ways which are continuous and uniform in the sense that they have no sudden changes of direction and the blades are evenly spaced apart throughout their length. Consequently the fruit is set by the operative in the correct fruit-pitting position when it is placed on the guide-blades and is pushed along these undulatory guideways continuously without the necessity for rotating or partly rotating the fruit or changing its direction at a sharp angle as it is not necessary for the blades to cut right around the fruit. The essential purpose of the blades is to guide the fruit, the effective cutting of the fruit being performed by the circular saw. In other words, there is no change of position of the fruit in relation to the guideway. This allows the fruit to be passed along the guide-blades at the high speed that is obtainable by the use of tributary guideways.

I claim:

1. In a peach pitting machine, a main guideway, a tributary guideway forming the source of said main guideway, a second tributary guideway, said tributary guideways forming with the main guideway continuous undulating guideways.

2. In a fruit pitting machine, a pair of parallel main guide blades, a plurality of other pairs of tributary guide blades, a gate-blade connecting adjacent pairs of tributary guide blades alternately to the main pair of guide blades, and means for pushing the fruit forward along the guideways to fruit-gripping means.

3. In a peach pitting machine, a main feed-way, a plurality of tributary feedways, means adapted to feed the fruit in properly spaced relationship alternately from the separate tributary feedways to the main feedway, means for carrying said fruit along said main feedway, means for gripping said fruit, means for causing said carrying means associated with the main feedway to lag when the fruit reaches the gripping means, a circular saw, means for carrying said gripping means and fruit past said circular saw so that the fruit is severed, and means for removing the halved pits from the halves of the fruit.

4. In a peach pitting machine, a plurality of tributary guideways, a main guideway fed by said tributary guideways, pitter mechanism fed by said main guideway, and means on said guideway to ensure delivery of each peach to said pitter mechanism with its pit in predetermined relationship to said pitter mechanism.

5. In a peach pitting machine, a main guideway, means for bringing the fruit in spaced relationship into said main guideway, a rotary shaft, a rotary member carried by said shaft, radial pivoted bell-crank pusher fingers carried by said rotary member and adapted to push said fruit along said main guideway, and a stationary cam adapted to engage said bell-crank fingers and cause them to lag.

In testimony whereof I affix my signature.

ALBERT STANLEY RIDLEY.